Patented Oct. 8, 1929

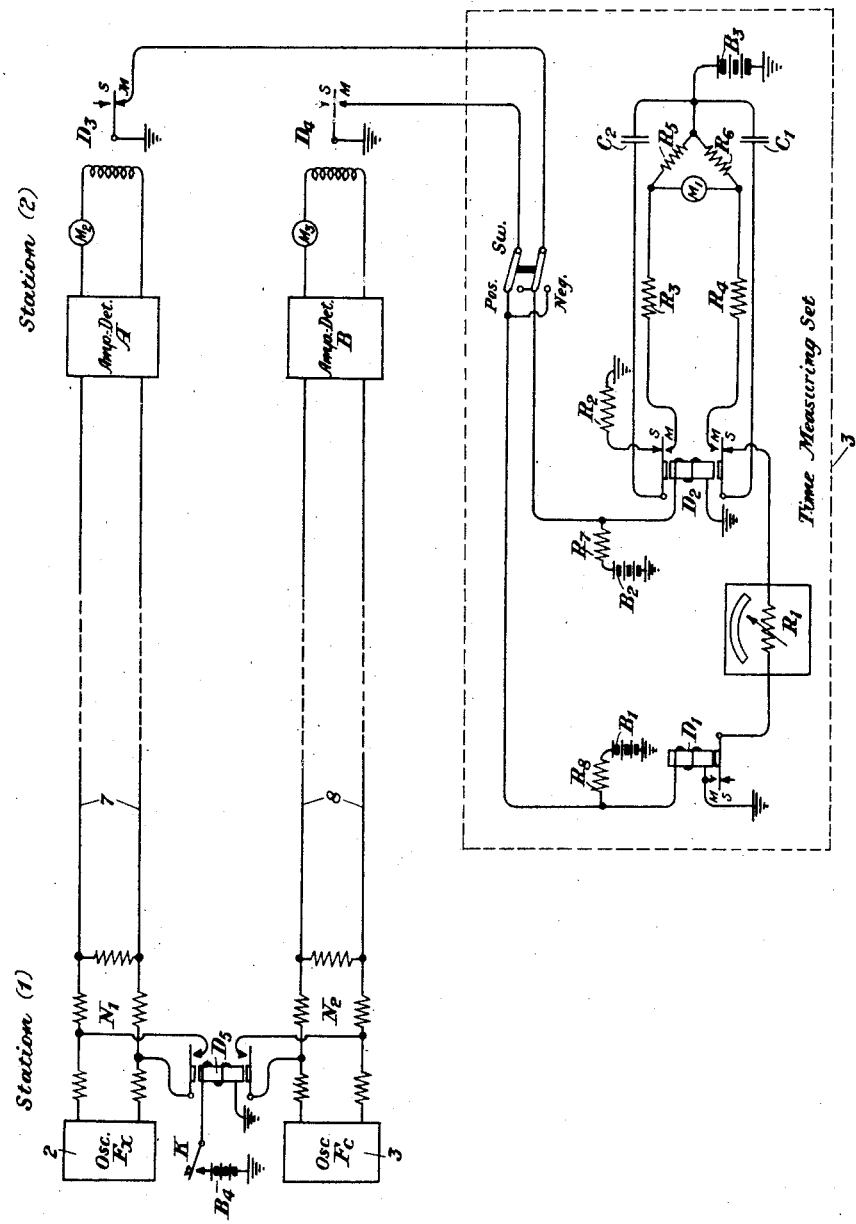

1,730,368

UNITED STATES PATENT OFFICE

JOSEPH HERMAN, OF WESTFIELD, NEW JERSEY, ASSIGNOR TO AMERICAN TELEPHONE AND TELEGRAPH COMPANY, A CORPORATION OF NEW YORK

METHOD OF AND MEANS FOR MEASURING DIFFERENCES IN TIME OF PROPAGATION OF WAVE FRONTS OF DIFFERENT FREQUENCIES OVER A CIRCUIT

Application filed December 2, 1927, Serial No. 237,302. Renewed December 7, 1928.

This invention relates to methods of and means for measuring the differences in the time of propagation of a wave front over a circuit with currents of various frequencies.

An instance wherein measurements of this character might be of value would be in the construction and design of new circuits, and more particularly with respect to the design of networks to be utilized in such circuits to equalize the time of propagation thereover of currents of different frequencies. Other uses and features of the invention will appear more fully from the detailed description hereinafter given.

The invention utilizes the measuring device disclosed in a copending application in the name of J. Herman, filed September 2, 1926, Serial No. 136,887. In this device, the method of operation consists in charging a condenser during the interval of time to be measured, discharging this condenser through an indicating means, such as a differential meter, adjusting the electrical constants of the charging circuit of the condenser by means of a variable resistance, repeating the above operations until the charge accumulated on the condenser is equal to a known charge, and utilizing the values of the electrical constants of the charging circuit when the charge accumulated on the condenser is equal to a known charge to determine the interval of time to be measured. In the arrangements and method of the present invention, current of any desired frequency will be applied to or cut off from one end of a circuit utilized as a standard for calibration purposes. This current will operate responsive means at the other end of the circuit. This responsive means will start the charging of the condenser in the time measuring set, or in other words, will start the measuring set in operation. Simultaneously, current of a certain frequency will be applied to a circuit in which it is desired to measure differences in delay at different frequencies, or in other words, differences in the time of propagation of a wave front thereover at different frequencies. This current will operate responsive means at the end of said circuit. This responsive means will be utilized to control the discharging of the condenser in the time measuring set, or in other words, to stop the operation of the measuring set. The interval thus measured by the measuring set will represent the difference in delay over the two circuits with respect to the definitely chosen frequency transmitted over said second circuit. The above operation will now be repeated, only a different definite frequency will be transmitted over the second circuit. A comparison of the two readings will now afford an indication of the difference in the time of propagation over said second circuit of the two different frequencies utilized. In other words, the two readings of the measuring set may be subtracted to give the difference in delay at the two different frequencies over said second circuit.

The invention may be more fully understood from the following description together with the accompanying drawing in the figure of which is illustrated a circuit diagram embodying a preferred form of the invention.

In the drawing is shown a circuit 8 to one end of which is connected an oscillator 3. This oscillator may have a frequency $F_c$ which may be any desired frequency. Circuit 8 will include an amplifier-detector B, a meter $M_3$ and the winding of a relay $D_4$. A circuit 7 is also provided. It is over this circuit that it is desired to measure differences in time of propagation of a wave front at different frequencies, or in other words, to measure differences in delay thereover at different frequencies. Accordingly, there will be connected to line 7 an oscillator 2. This oscillator may be adjusted to transmit any one of a number of desired frequencies. Circuit 7 will include an amplifier-detector A, a meter $M_2$ and the winding of a relay $D_3$. The time measuring set 3 is substantially similar to that illustrated in the aforementioned copending application filed in the name of J. Herman, and will include a relay $D_1$ for closing a charging circuit for the condenser $C_1$ through the variable resistance $R_1$. It will also include a relay $D_2$ for discharging the condensers $C_2$ and $C_1$ through a differential meter $M_1$. A double-pole switch SW is provided for purposes to be pointed out hereinafter. The relay $D_4$ normally controls a short circuit about the winding of relay $D_1$, and the relay $D_3$ controls a normally closed short circuit about the winding of relay $D_2$. The circuits 7 and 8 include the resistance networks $N_1$ and $N_2$, respectively. Bridged across these networks are two circuits which may be closed upon the operation of the relay $D_5$ and which will be operated by the key K. The closing of these two circuits will serve to simultaneously short-circuit the outputs of oscillators 2 and 3.

The operation of the arrangements is as follows: Normally, current will be flowing from the oscillators 2 and 3 over the lines 7 and 8 and will hold the relays $D_3$ and $D_4$ on their M contacts. The oscillator 2 will now have its frequency adjusted to some desired value. The key K will now be closed. This will operate relay $D_5$, which will close a short-circuit across the outputs of both of the oscillators. Accordingly, relays $D_3$ and $D_4$ will eventually release. The release of relay $D_4$ will open the normally closed short-circuit about the winding of relay $D_1$. Relay $D_1$ will operate and close a charging circuit for condenser $C_1$ through the resistance $R_1$. When relay $D_3$ releases, the normally closed short-circuit about the winding of relay $D_2$ will be opened and relay $D_2$ will operate, thereby discharging condensers $C_1$ and $C_2$ through the differential meter $M_1$. Key K will be opened and closed repeatedly and the resistance $R_1$ adjusted until the meter $M_1$ will show no deflection. The reading of resistance $R_1$ will then be noted. The frequency of oscillator 2 will now be changed to one of certain other frequencies which it is desired to measure. The above process will then be repeated for each frequency and the reading of $R_1$ noted. The difference between one of these readings, chosen as a reference, and the other readings, will represent the difference in time of propagation over the circuit 7 of wave fronts of the different chosen frequencies. In case it should be found that under certain conditions the relay $D_3$ would operate before the relay $D_4$, the switch SW is provided with two positions so that the connections to these relays may be interchanged.

While the invention has been disclosed in certain specific arrangements which are deemed desirable, it is understood that it is capable of embodiment in many and other widely varied forms without departing from the spirit of the invention as defined by the appended claims.

What is claimed is:

1. The combination of a time measuring set whereby a direct indication may be given of the time interval between the operation of two responsive devices, of two separate circuits each connected to one of said responsive devices, an oscillator of a definite frequency connected to the first of said circuits, an oscillator adapted to generate a plurality of desired frequencies connected to said second circuit, means for simultaneously controlling the application of current from said oscillators to said circuits, means controlled by one of said responsive means for starting said measuring set in operation, and means controlled by the other of said responsive means for stopping the operation of said measuring set.

2. The method of measuring difference in delay over a circuit with currents of different frequencies, which comprises controlling the application of current of a definite frequency over a circuit to be utilized for comparative purposes, simultaneously controlling the application of current of one of a plurality of desired frequencies over the circuit in question, measuring the difference in delay between the current of known frequency and the current of desired frequency over the separate circuits, repeating the measurement in turn with currents of other of the plurality of desired frequencies over the circuit in question, and comparing said measurements.

In testimony whereof, I have signed my name to this specification this 1st day of December 1927.

JOSEPH HERMAN.